(12) United States Patent
Tichy et al.

(10) Patent No.: US 11,999,222 B2
(45) Date of Patent: Jun. 4, 2024

(54) REVISED MOUNTING POINT

(71) Applicants: Magna Exteriors Inc., Concord (CA); Stanislav Tichy, Troy, MI (US)

(72) Inventors: Stanislav Tichy, Troy, MI (US); Riad Chaaya, Clarkston, MI (US); Mark P. Birka, Northville, MI (US); Christopher J. Kuntze, Goodrich, MI (US); Jeff Rubis, South Lyon, MI (US); Heiner Salzmann, Metamora, MI (US)

(73) Assignee: Magna Exteriors Inc., Aurora (CA)

( * ) Notice: Subject to any disclaimer, the term of this patent is extended or adjusted under 35 U.S.C. 154(b) by 40 days.

(21) Appl. No.: 17/620,332

(22) PCT Filed: Jun. 19, 2020

(86) PCT No.: PCT/US2020/038762
§ 371 (c)(1),
(2) Date: Dec. 17, 2021

(87) PCT Pub. No.: WO2020/257666
PCT Pub. Date: Dec. 24, 2020

(65) Prior Publication Data
US 2022/0348060 A1 Nov. 3, 2022

Related U.S. Application Data

(60) Provisional application No. 62/864,685, filed on Jun. 21, 2019, provisional application No. 62/864,691, (Continued)

(51) Int. Cl.
*B60J 5/10* (2006.01)
*B29C 45/14* (2006.01)
(Continued)

(52) U.S. Cl.
CPC ......... *B60J 5/107* (2013.01); *B29C 45/14336* (2013.01); *B29C 45/14631* (2013.01);
(Continued)

(58) Field of Classification Search
CPC ..... B60J 5/107; B60J 5/101; B60J 5/10; B60J 5/0472; E05Y 2900/546; E05D 3/127; B62D 27/02; B62D 29/004
(Continued)

(56) References Cited

U.S. PATENT DOCUMENTS 6,811,209 B2 * 11/2004 Woollett ............ B62D 33/0617
296/146.2
8,985,675 B1 * 3/2015 Gangal ..................... B60J 5/107
296/146.8
(Continued)

FOREIGN PATENT DOCUMENTS

DE 102014213544 A1 1/2015
EP 1120303 A1 * 8/2001 .............. B60J 5/101
(Continued)

OTHER PUBLICATIONS

Imbert et al. EP 3388266 A1, "Door of a motor vehicle", machine translation, ip.com, Oct. 17, 2018 (Year: 2018).*
(Continued)

*Primary Examiner* — Amy R Weisberg
*Assistant Examiner* — Wenwei Zhuo
(74) *Attorney, Agent, or Firm* — Warn Partners, P.C.

(57) ABSTRACT

A liftgate having an overmolded hinge point comprising a metal reinforcement overmolded with a polymer and having a compression limiter portion molded in. The compression limiter portion including a tubular portion for receiving a fastener encapsulated during overmolding and having overmolded gusset ribs extending therefrom during the overmolding process.

8 Claims, 3 Drawing Sheets

Related U.S. Application Data filed on Jun. 21, 2019, provisional application No. 62/864,785, filed on Jun. 21, 2019, provisional application No. 62/864,878, filed on Jun. 21, 2019, provisional application No. 62/864,981, filed on Jun. 21, 2019.

(51) Int. Cl.
  *B29C 45/44* (2006.01)
  *B29K 705/00* (2006.01)
  *B29L 31/30* (2006.01)

(52) U.S. Cl.
  CPC .... *B29C 45/44* (2013.01); *B29C 2045/14327* (2013.01); *B29C 2045/445* (2013.01); *B29K 2705/00* (2013.01); *B29L 2031/3014* (2013.01); *E05Y 2201/636* (2013.01); *E05Y 2600/626* (2013.01); *E05Y 2900/546* (2013.01)

(58) Field of Classification Search
  USPC ........... 296/146.8, 146.9, 146.11, 146.6, 106
  See application file for complete search history.

(56) References Cited

U.S. PATENT DOCUMENTS

| | | | | |
|---|---|---|---|---|
| 11,117,627 | B2* | 9/2021 | Pleet | B62D 25/04 |
| 2004/0124659 | A1* | 7/2004 | Vaitus | B60J 5/107 |
| | | | | 296/106 |
| 2010/0102589 | A1* | 4/2010 | Miyake | B60S 1/583 |
| | | | | 296/146.8 |
| 2012/0223543 | A1* | 9/2012 | Snider | H04R 5/02 |
| | | | | 296/146.16 |
| 2016/0167493 | A1* | 6/2016 | Adachi | B60J 5/107 |
| | | | | 49/502 |
| 2018/0290523 | A1* | 10/2018 | Imbert | B60J 5/0433 |
| 2021/0291911 | A1* | 9/2021 | Brands | B62D 29/004 |

FOREIGN PATENT DOCUMENTS

| | | | | |
|---|---|---|---|---|
| EP | 3388266 | A1 * | 10/2018 | ............ B60J 5/0433 |
| EP | 3388266 | A1 | 10/2018 | |
| FR | 3094944 | A1 * | 10/2020 | ............ B60J 5/0431 |
| WO | 2009115763 | A2 | 9/2009 | |

OTHER PUBLICATIONS

International Search Report for PCT/US2020/038762 dated Sep. 4, 2020, 1-page.

* cited by examiner

REVISED MOUNTING POINT

CROSS-REFERENCE TO RELATED APPLICATIONS

This application is a National Stage of PCT International Application No. PCT/US2020/038762, filed Jun. 19, 2020 and claims the benefit of U.S. Provisional Patent Application No. 62/864,685, filed Jun. 21, 2019, U.S. Provisional Patent Application No. 62/864,691, filed Jun. 21, 2019, U.S. Provisional Patent Application No. 62/864,785, filed Jun. 21, 2019, U.S. Provisional Patent Application No. 62/864,878, filed Jun. 21, 2019 and U.S. Provisional Patent Application No. 62/864,981, filed Jun. 21, 2019. The disclosures of the above applications are incorporated herein by reference.

FIELD OF THE INVENTION

The present invention relates to a revised mounting point for a hinge or the like using and overmolding arrangement.

BACKGROUND OF THE INVENTION

In some liftgate arrangements the liftgate is made with at least one structural plate which includes hard points and hinge mounting arrangements built in. In some cases a cast aluminum member which forms the entire periphery of the liftgate is used. While this provides strong and robust attachment points. The aluminum casting still remains less than desirable from a weight standpoint and more costly to manufacture and assemble.

Liftgates using steel reinforcements overmolded with a thermoplastic are increasingly popular due to cost and weight reduction in the assembly. However, providing reinforcements for hinge points and hard points are challenging and sometimes require after overmolding assemblies to be added.

Additionally, in many cases 3D metal ribs need to be connected to the metal base plate of the overmolding part in order to transfer load.

Therefore, it is a goal in the art to utilize the molding process to connect and position the ribs to the base metal plate. Create geometrical features in the base plate and the rib to accommodate the above. It is also a goal to use the overmolding process to provide hard points and compression limiters while using an overmolding process. This would allow creating joints between metal parts without a welding process and allow load transfer ribs to be accommodated by an overmolding connection.

SUMMARY OF THE INVENTION

In accordance with the present invention there is provided a liftgate having an overmolded hinge point comprising a metal reinforcement overmolded with a polymer and having a compression limiter portion molded in, the compression limiter portion including a tubular portion for receiving a fastener encapsulated during overmolding and having overmolded gusset ribs extending therefrom during the overmolding process.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
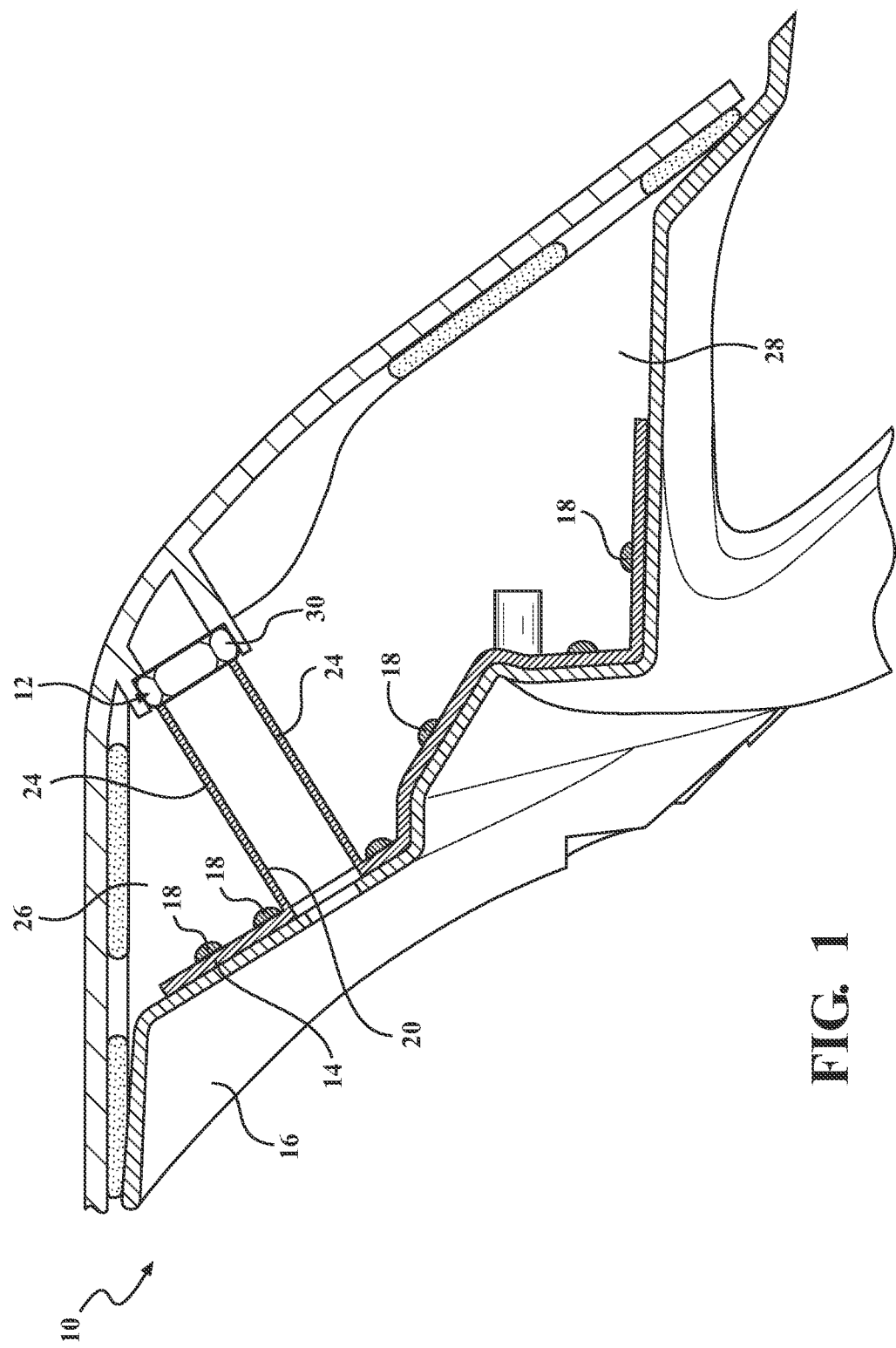
FIG. 1 is a sectional view of an overmolded hinge point area of a liftgate of the present invention.
Figure 2:
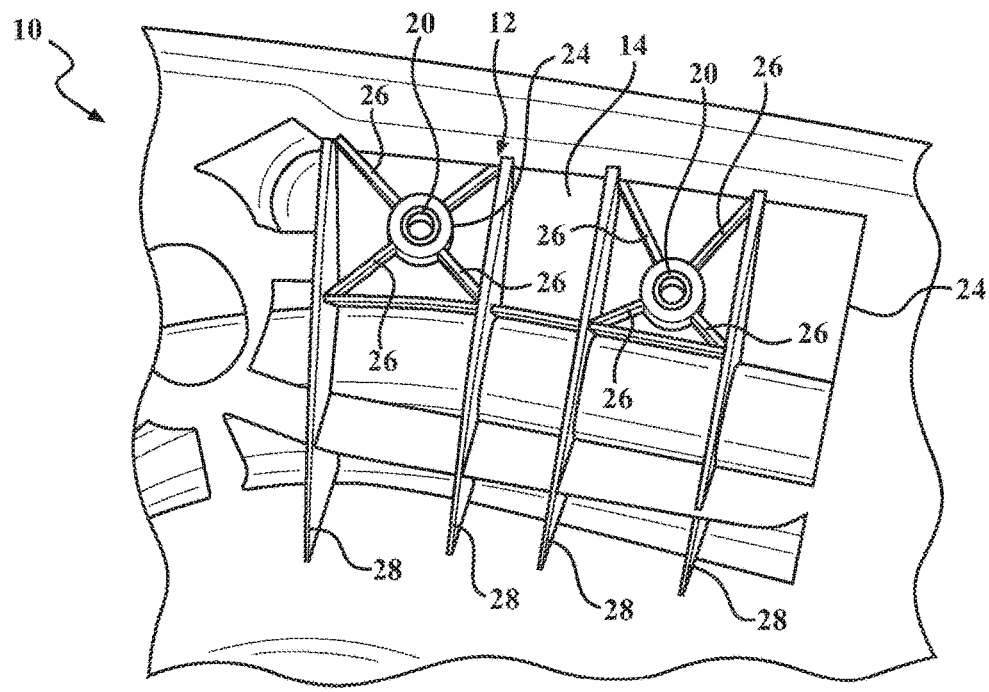
FIG. 2 is a perspective view of the hinge point area of a liftgate which is formed in an overmolding process in accordance with the present invention.

The following description of the preferred embodiment(s) is merely exemplary in nature and is in no way intended to limit the invention, its application, or uses.

Referring now to the drawings there is provided a liftgate generally shown at 10. The liftgate 10 has an overmolded hinge point generally indicated at 12. A metal reinforcement 14 is overmolded with a polymer 16. Overmolding attachment feature are through molded for securement of the metal reinforcement 14 at predetermined areas such as at "button" areas 18.

A compression limiter portion 20 is molded in. The compression limiter portion 20 as shown is a structural tubular portion such as a metal tube for receiving a fastener such as for a hinge encapsulated by and outer polymer layer 24 during overmolding. In an alternate embodiment the compression limiter portion 20 could be provided by a raised portion of the sheet metal such as could be provided by a punch or the like during stamping of the metal reinforcement. In a preferred embodiment the tubular portion 20 is threaded or a nut 30 is provided and welded to the steel tube 20 in order to provide a threaded attachment area for a hinge of a liftgate.

Overmolded gusset ribs 26 are attached to the length of the portion 20 and also extend radially outward therefrom during the overmolding process. The overmolding process can also be used for positioning and securing vertical metal ribs 28 during the overmolding process to provide rigidity to the hinge mounting area.

A compression limiter portion 20 is molded in. The compression limiter portion 20 as shown is a structural tubular portion such as a metal tube for receiving a fastener such as for a hinge encapsulated by and outer polymer layer 24 during overmolding. In an alternate embodiment the compression limiter portion 20 could be provided by a raised portion of the sheet metal such as could be provided by a punch or the like during stamping of the metal reinforcement. In a preferred embodiment the tubular portion 20 is threaded or a nut 30 is provided and welded to the steel tube 20 in order to provide a threaded attachment area for a hinge of a liftgate.

Figure 3:
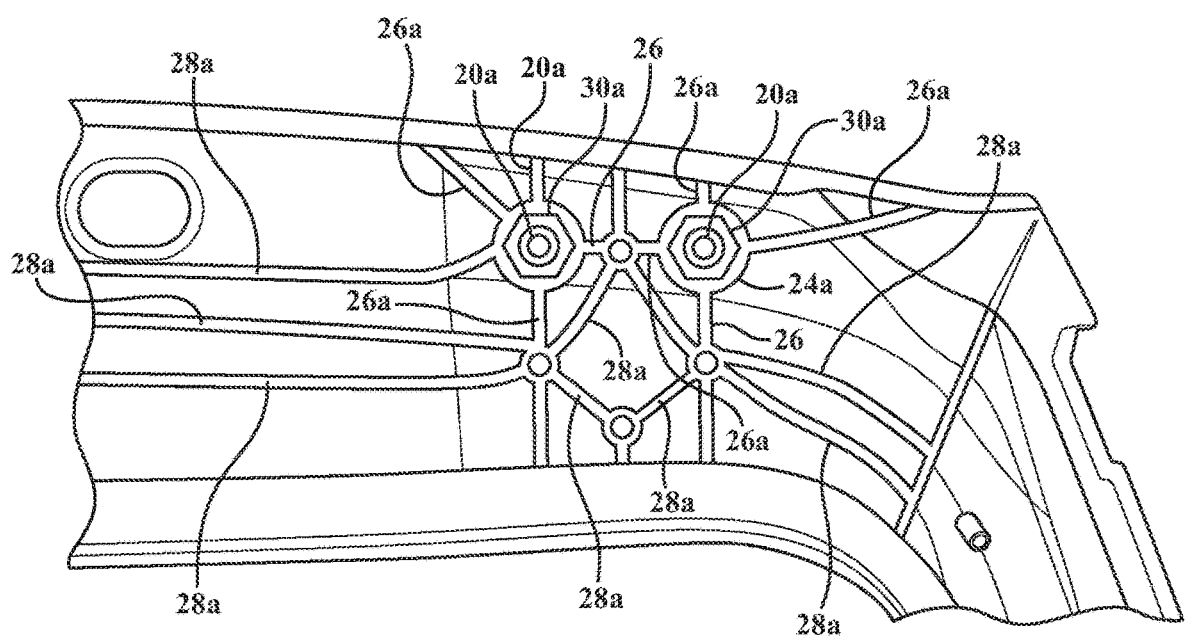
FIG. 3 is a view of a hinge point area of a cast aluminum liftgate.

FIG. 3 shows an alternate layout for overmolded gusset ribs 262 are attached to the length of the portion 20*a* and also extend radially outward therefrom during the overmolding process. The overmolding process can also be used for positioning and securing additional vertical metal ribs 28*a* during the overmolding process to provide rigidity to the hinge mounting area. In an alternate embodiment the ribs 28a are overmolded with a structural polymer without a steel reinforcement.

A compression limiter portion 20a is molded in. The compression limiter portion 20 as shown is a structural tubular portion such as a metal tube for receiving a fastener such as for a hinge encapsulated by and outer polymer layer 24a during overmolding. In an alternate embodiment the compression limiter portion 20a could be provided by a raised portion of the sheet metal such as could be provided by a punch or the like during stamping of the metal reinforcement. In a preferred embodiment the tubular portion 20a is threaded or a nut 30a is provided and welded to the steel tube 20a in order to provide a threaded attachment area for a hinge of a liftgate.

Figure 4:
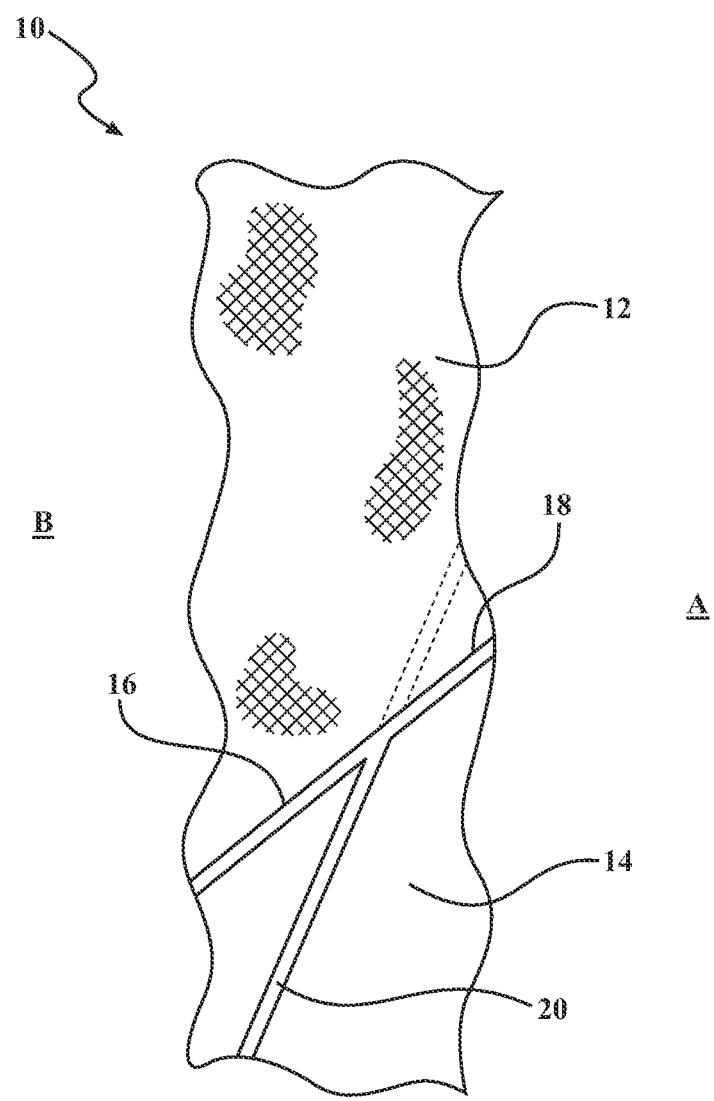
FIG. 4 is a view of a sealing plane functional sinkmark used for controlling water capillary action in a seal of a liftgate.

Shown in FIG. 4 there is provided a sealing plan functional sink mark which may be useful to avoid capillary action if a sink mark exists in a sealing portion of a molded tail gate. In order to break the capillary action a second channel connects to the sink mark and prevents the water from being sucked into the inside of the car. This creates a condition where the water would be forced to flow upwards and beyond the second channel thereby reducing the capillary action of the second channel.

Referring to FIG. 4, an overmolded vehicle part is generally shown at 110. The vehicle part 110 can be any type of part which includes a dry side A (interior or other) and a wet side B (exterior or other). The overmolded part has a metal overmolded reinforcement 112 which is attached to a second polymer portion 114 at a sealing surface 116. The sealing surface being inclined in an upward direction from the wet side B to the dry side A which usually has a sink read through at portion 118. A second channel 120 is provided for intersecting the inclined sealing surface 116 for reducing and tendency of capillary effect moisture to rise through the sealing surface. The inclined angle of the second channel is greater than the inclined angle of the sealing surface. The second channel 120 is preferably a sink mark molded into the polymer part.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate having an overmolded fastening point comprising a metal reinforcement overmolded with a polymer and having a compression limiter portion molded in, the compression limiter portion including a metal tubular portion for receiving a fastener encapsulated during overmolding and having overmolded gusset ribs extending therefrom during the overmolding process such that the molding process is operably used to connect and position the gusset ribs of the compression limiter portion.

2. The liftgate of claim 1 wherein the tube is a steel tube.

3. The liftgate of claim 1 wherein the tube includes a threaded portion.

4. The liftgate of claim 3 wherein the threaded portion is a nut.

5. The liftgate of claim 1 wherein the at least one of the gusset ribs are an overmolded steel rib.

6. The liftgate of claim 1 where the gusset ribs are thermoplastic.

7. The liftgate of claim 1 wherein the reinforcement ribs are molded extending in the same axial direction from the tubular portion for reinforcing the attachment point.

8. The liftgate of claim 1 wherein the compression limiter is stamped into the metal reinforcement.

* * * * *